No. 12,852. REISSUED SEPT. 8, 1908.
W. H. WALDEN.
RAILWAY TRACK FASTENER.
APPLICATION FILED APR. 23, 1908.
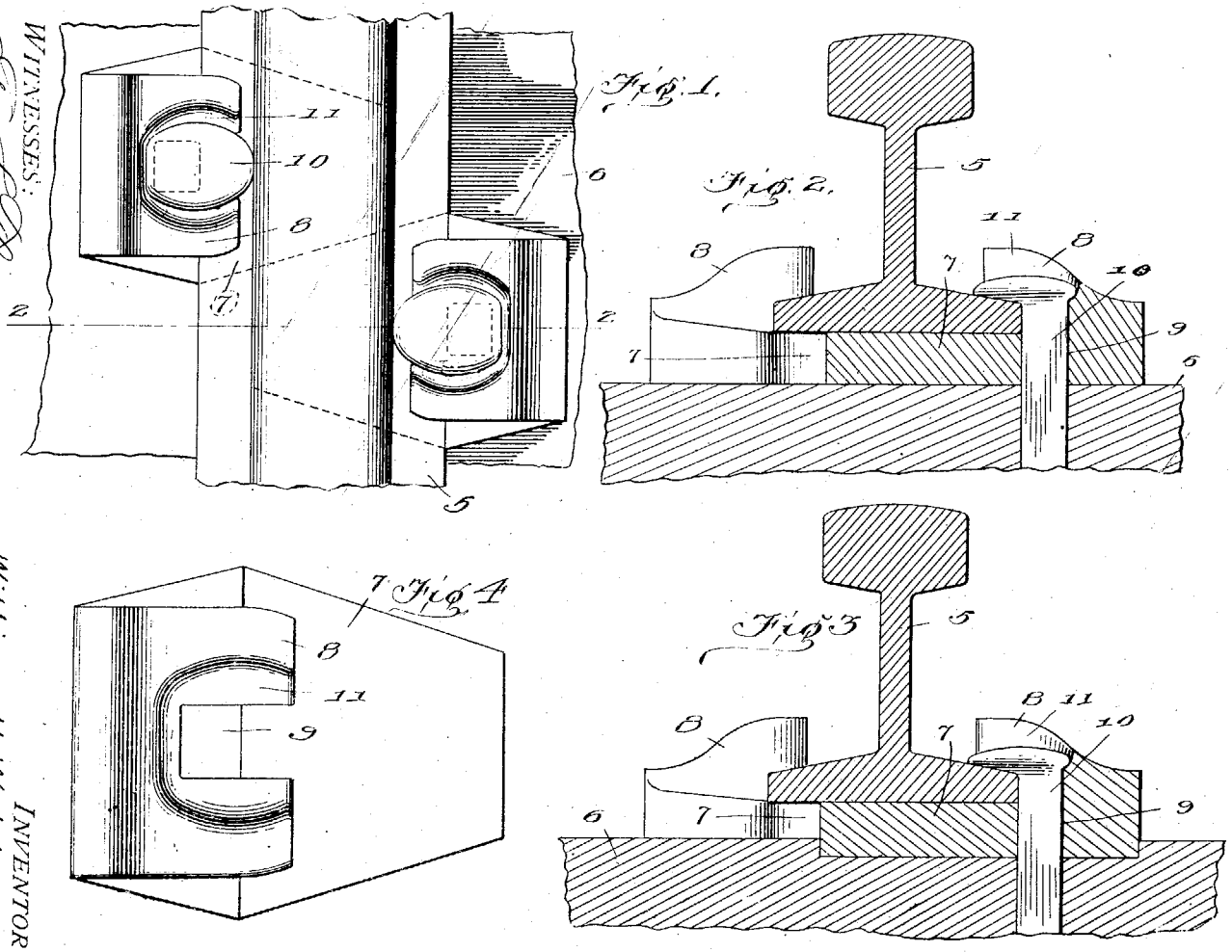
WITNESSES:
Geo. L. Thorn
Geo. E. Tew.
INVENTOR
William H. Walden.
BY Milo B. Stevens & Co
Attorneys.

UNITED STATES PATENT OFFICE.

WILLIAM H. WALDEN, OF EAST MACON, GEORGIA.

RAILWAY-TRACK FASTENER.

No. 12,852. Specification of Reissued Letters Patent. Reissued Sept. 8, 1908.

Original No. 858,124, dated June 25, 1907, Serial No. 331,194. Application for reissue filed April 23, 1908. Serial No. 428,932.

*To all whom it may concern:*

Be it known that I, WILLIAM HARRISON WALDEN, a citizen of the United States, residing at East Macon, in the county of Bibb and State of Georgia, have invented new and useful Improvements in Railway-Track Fasteners, of which the following is a specification.

This invention is a railway track fastener, and has for its object to provide simple and efficient means for securing the rails to the ties, producing a combined tie plate and brace which supports the weight and which acts to prevent lateral movement of the rail, and which utilizes the weight to clamp the rail to the tie.

In the accompanying drawing, Figure 1 is a plan view showing the application of the invention. Fig. 2 is a transverse section on the line 2—2 of Fig. 1, the fastener being shown in position on top of the tie, as when newly applied. Fig. 3 is a similar view with the fastener sections sunken into the tie, as they will be in use. Fig. 4 is a plan of one of the fastener sections.

Referring specifically to the drawings, 5 indicates one of the track rails and 6 the tie. The fastener consists of or comprises a pair of similar sections arranged on opposite sides of the rail, and each section has a flat bottom plate 7 which is inserted between the tie and the base of the rail. At the outer end of the plate a clip 8 is formed, and this clip extends over and engages the flange of the base of the rail. The plate has a hole 9 to receive the spike 10 by which the rail is fastened to the tie, and above said hole the clip is provided with a countersunk recess 11 to receive the head of the spike at a close fit. The recess is such that the head of the spike comes in contact with and engages the base of the rail in the usual manner, and the recess forms two parts or sections of the clip which engage the rail base on both sides of the spike head. In use, two of these sections are employed on each rail at the tie, and they are arranged with the plates side by side, and with the clip of one section engaging the outer base flange of the rail and the clip of the other section engaging the inner base flange, and the sections coöperate with each other to prevent movement of the rail and to hold the same firmly to the tie.

The bottom plate 7 of each fastener section is made wedge shaped at its inner end, as shown, and its widest point is on a line with the inner edge of the spike hole, so that when the fastener is applied to a rail the said widest point will be under the edge of the rail base. This point or line will hereafter be referred to as the fulcrum line, since in use the fastener section or plate acts to a certain extent as a lever to clamp the rail by means of the clip and the spike. The inner end of the plate, that is, the part under the base of the rail, may extend completely across under the rail, but must not extend more than that, that is, must not extend beyond the opposite edge of the rail. Preferably it is made somewhat shorter than the width of the base of the rail, say about two-thirds of the distance across under the rail base. This will depend somewhat on the size of the rail and the width of the rail base, and will vary with rails of different sizes, but the best results are, I believe, obtained when the inner end or edge of the plate is located substantially on a line under the line of the edge of the head of the rail. These plates are preferably applied in contact with each other, as shown in Fig. 1, but they may be spaced somewhat from each other if desired, without interfering with the operation of the fastener or clamp.

The plates will in use quickly settle into the top of the tie. The passage of a few heavy trains thereover will produce this effect, depending to some extent on the kind of wood in the tie, but I have found by practical test that the plates will settle into the tie one quarter of an inch or more. As mentioned above, the plates are made wedge shaped, with their narrower ends under the rail, and in consequence of this shape, and in consequence of the greater weight resting thereon, these inner ends will sink or tend to sink farther into the tie than the larger or wider outer part at the fulcrum line. In other words, the inner ends of the plates being narrower will more easily cut into the tie. This produces a result on which the efficiency of the fastener depends. The excess of weight and greater tendency to yield at the inner ends of the plates tends to turn said plates on the fulcrum line, in other words tends to swing or turn the clips 8 inwardly toward the base of the rail, thereby producing a pressure on the base which holds the same down and also producing pressure on the back of the head of the spike, pressing and holding the same upon or toward the base of the rail. The vertical weight on the rail, in consequence of the lever action of the fastener sections, is thereby utilized to assist in holding the rail and preventing any lateral shift or movement. And accordingly the greater the weight on the rail the tighter will be the grip produced by the clip. The fact that the plates are when in use sunken into the tie also very greatly increases the resistance to lateral movement or spreading of the rails; and the fastener is therefore very useful at curves.

It has been remarked, above, that the inner end of the plate, that is, the end opposite the clip 8, should not project beyond the base of the rail. The reason for this is that if the end should so project the lever or clamping action described would be mainly or wholly lost, since the plate would simply transmit the dead weight upon the rail to the tie.

I am aware that many tie plates were made prior to the date of my invention, extending across under the base of a rail and beyond both edges thereof, and as a rule, spiked down on both sides. Such plates are entirely destitute of the idea of my invention and have no such effect as the plates shown and described by me.

The fastener sections not only hold the rail, but also hold the spikes, and it is therefore possible to use smaller spikes than those ordinarily used, which reduces the cost and is advantageous with respect to the tie. The fulcrum line at the edge of the base of the rail is also the line of the face of the spike, that is, the inner side of the spike, and consequently the spike assists in preventing lateral movement of the plate and in producing the leverage or clamping action referred to above.

A minor feature of advantage is that dust, dirt and oil will collect in the recess above the head of the spike and will tend to prevent water from following down the spike and rotting the tie around the same.

The fastener, as stated, is used in pairs, the sections being oppositely arranged, and they exert their action or effect on opposite sides of the rail, and so a clamp is produced which prevents displacement of the rail in either direction.

The device is capable of modification within the scope of the invention, and no limitation is implied from the particular construction shown.

I claim:

1. A rail fastener comprising a plate between the base of the rail and the tie, the plate having at one end a clip projecting over the base flange of the rail, and having a narrowed portion at the other end, terminating under the rail.

2. The combination with a rail and a compressible tie, of a plate one end of which is located under the base of the rail, having at the other end a clip overlapping the edge of the base of the rail, that end of the plate under the rail being of less width than the other or outer end, whereby it will more readily be depressed into the tie by weight on the rail, and means to fasten the plate to the tie.

3. The combination with a rail and a compressible tie, of a pair of plates located beside each other, between the base of the rail and the tie, and adapted to be pressed into the tie by weight on the rail, the plates having clips at their outer ends engaging over opposite edges of the rail base, and being narrowed at their inner ends under the rail base, whereby said ends will be more readily pressed into the tie than the outer ends, and means to fasten the plates to the tie.

4. The combination with a rail and a compressible tie, of a plate having a narrow inner end under the rail and a wider outer end with a clip extending over the edge of the rail base, and having a spike hole with its inner edge in line with the edge of the rail base, and a spike extending through said hole and into the tie, the head of the spike engaging the rail base at the inner side and bearing against the clip at the outer side.

5. The combination with a rail and a wooden tie, of a plate the inner end of which is under the rail and the outer end of which has a clip overlapping the edge of the rail base, that part of the plate under the middle part of the rail base being of less width than that part at the edge of the base, whereby the former part will be more readily pressed into the tie, the plate having a spike hole therein at the edge of the rail base and the clip having a recess above said hole, and a spike driven through the hole and into the tie, with its head in said recess and engaging the said base.

6. A rail fastener comprising a plate between the rail base and the tie, and having at one end a clip extending over the base flange of the rail, said plate having a hole to receive a spike the head of which engages the base flange of the rail, and the clip having a countersunk recess in the inner edge thereof to receive the head of the spike.

7. The combination with a rail and a compressible tie, of a clamping plate located between the base of the rail and the tie and expanded outwardly to a point under the edge of the rail base, forming a fulcrum line along under the said edge the inner end of the plate being under the rail base.

In testimony whereof I have signed my name to this specification in the presence of two subscribing witnesses.

WILLIAM H. WALDEN.

Witnesses:
WILLIAM J. CARTER,
GEO. E. TEW.